Dec. 4, 1934.    P. C. ACKERMAN    1,982,896
ROLLER BEARING
Filed Sept. 16, 1933
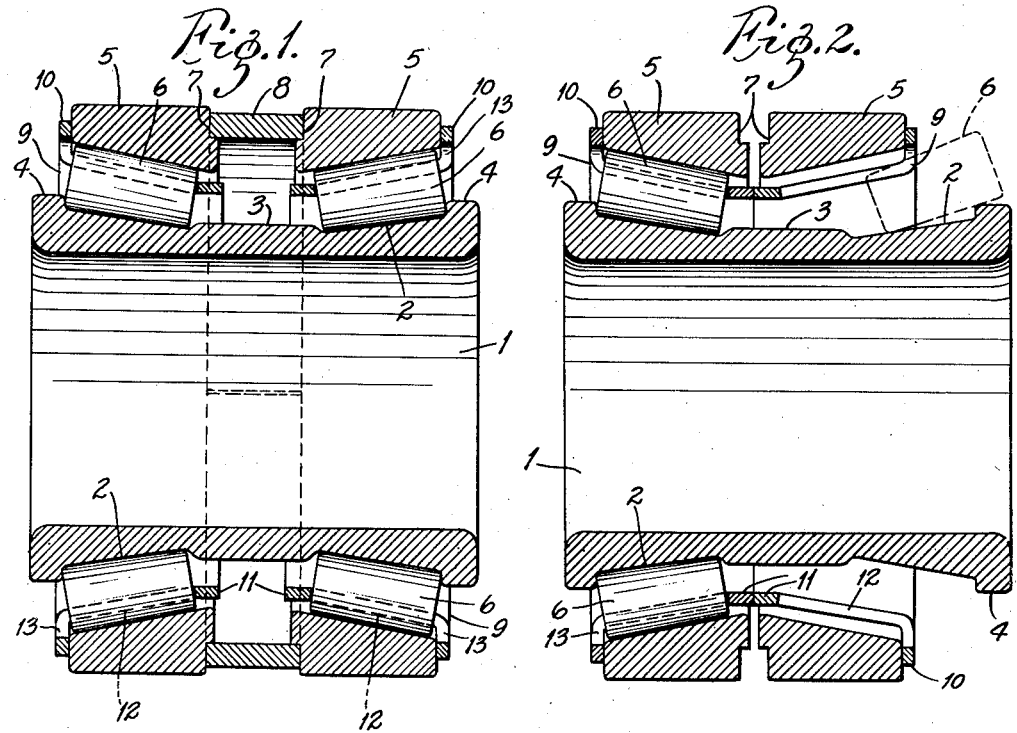
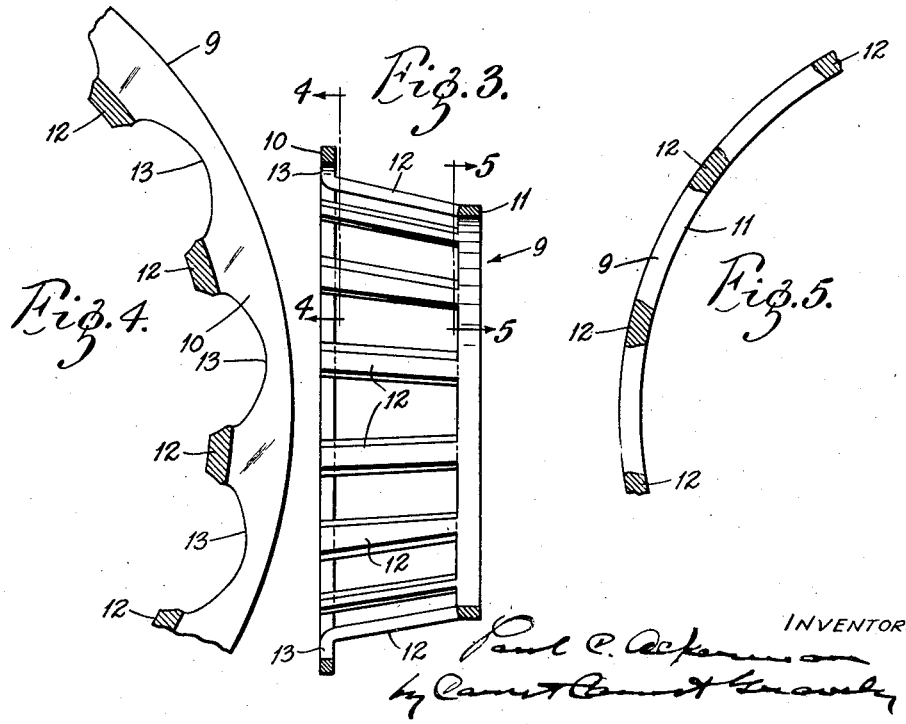
INVENTOR.
Paul C. Ackerman
HIS ATTORNEYS.

Patented Dec. 4, 1934

1,982,896

UNITED STATES PATENT OFFICE 1,982,896

ROLLER BEARING

Paul C. Ackerman, Canton, Ohio, assignor to The Timken Roller Bearing Company, Canton, Ohio, a corporation of Ohio Application September 16, 1933, Serial No. 689,716

5 Claims. (Cl. 308—214)

My invention relates to roller bearings of the type wherein the inner bearing member is a single piece with two inwardly tapering raceways. The principal object of the invention is to simplify the construction and to facilitate the assembly of its parts.

It consists in the constructions and arrangements of parts hereinafter described and claimed.

In the accompanying drawing, wherein like reference numerals refer to like parts wherever they occur, Fig. 1 is a longitudinal sectional view of my bearing assembled;

Fig. 2 is a similar view of said bearing in the course of assembly;

Fig. 3 is a longitudinal section of the cage; and

Figs. 4 and 5 are fragmental cross-sections of the cage.

The inner bearing member 1 of my present bearing is in the form of a sleeve with two inwardly tapering raceways or bearing surfaces 2 that taper toward each other and are separated by a wide rib 3 forming shoulders. Said inner bearing member also has a shoulder or thrust rib 4 at the large end of each raceway.

There is a separate conical cup or outer tapered raceway member 5 corresponding to each of the inner raceways; and between each pair of inner and outer raceways are interposed a series of tapered rollers 6. Preferably, the conical outer raceway extends the full length of the cup.

The large ends of said raceway members have annular grooves or rabbets 7 in their outer edges in which is seated an annular spacing member, preferably a split ring 8. Such a spacing ring is readily removable and replaceable; and by replacing a spacing ring of one length with a ring of a different length, the bearing cups may be readily adjusted longitudinally with respect to each other.

Each series of rollers is provided with a spacing cage 9 having pockets for the respective rollers. Such cage is made of a single integral piece comprising continuous end rings 10, 11 connected by bridges 12 that define the pockets. The inner edges of the bridges are broken down or "winged" and bear on the rollers beyond the axes thereof. The ring 10 at the large end of each cage extends longitudinally beyond the large end of the bearing cup and is made in the form of an annular radially extending flange that overlaps and extends radially beyond the bearing surface of said cup. Each of the pockets in the cage extends continuously from the ring at the small end of the cage entirely through the large end of the cage, such pockets forming a series of notches 13 in the inner edge portion of the large flanged end of the cage, such notches being of sufficient depth and width that the end ring does not obstruct endwise movement of the rollers.

The bearing hereinbefore described is quite simple in construction, strong and easy to assemble. The cup and cage for one of the raceways are slipped over the inner bearing member far enough to permit the rollers to be entered into position through the notches in the large end of the cage. Then the cup and cage of the other raceway are slipped over the opposite end of the inner bearing member far enough to permit the rollers to be entered into position through the notches in the large end of the second cage. Then the second cage and the second cup are moved away from the first mentioned cup and the split spacing ring is snapped into position in the seat provided therefor by the notches in the edges of the bearing cups. As will appear from an inspection of Fig. 2, the operation of inserting and removing rollers requires the roller to be tilted far enough to clear the thrust rib of the cone and this tilting is permitted by the notching of the flange at the large end of the cage along with the axial movement of the cage inwardly.

It is a special merit of the foregoing construction that it is applicable to bearings of small size as well as to bearings of large size. Also it is a merit of the construction that the outturned ring at the large end of each cage bears against the end of the outer bearing member and the cage is steadied thereby and at the same time is restrained from movement endwise.

What I claim is:

1. A roller bearing comprising an integral inner bearing member having two inwardly tapering raceways, separate outer raceway members, rollers interposed between the inner and outer raceway members, a spacing cage for each series of rollers, a spacing member between the outer raceway members, said cage having pockets for the individual rollers extending entirely through the large ends of the cage and means for preventing endwise movement of said cage.

2. A roller bearing comprising an integral inner bearing member having two inwardly tapering raceways, separate outer raceway members, rollers interposed between the inner and outer raceway members, an integral spacing cage for each series of rollers with its large end turned radially outwardly beyond the end of the adjacent outer raceway member, and a spacing member between the outer raceway members, said cage having pockets for the individual rollers extending entirely through the large end of the cage.

3. A roller bearing comprising an integral inner bearing member having two inwardly tapering raceways and shoulders at each end thereof, separate outer raceway members, rollers interposed between the inner and outer raceway members, an integral spacing cage for each series of rollers with its large end disposed radially opposite the end of the outer raceway member, and a removable spacing member between the outer raceway members, said cage having pockets for the individual rollers extending entirely through the large ends of the cage, and said raceways being such distance apart that each cage in turn may be moved endwise far enough to permit the insertion and removal of the rollers through the space between the end shoulder of the inner bearing member and the edge of the cage pocket.

4. A tapered roller bearing comprising an inner raceway member having a shoulder at each end, an outer raceway member, rollers between said members and a one-piece spacing cage having continuous end rings and pockets for said rollers, the ring at the large end having notches therethrough in continuation of the pockets and of a depth and width to avoid interference with endwise movement of the roller therein.

5. A one-piece conical cage for tapered roller bearings comprising a continuous ring at its small end, a continuous radially disposed ring at its large end, and bridge members extending from said small ring to the inner edge portion of said large ring and said large ring having notches in its inner edge portion in continuation of the spaces between said bridges and extending radially beyond said bridges.

PAUL C. ACKERMAN.